United States Patent Office 3,397,527
Patented Aug. 20, 1968

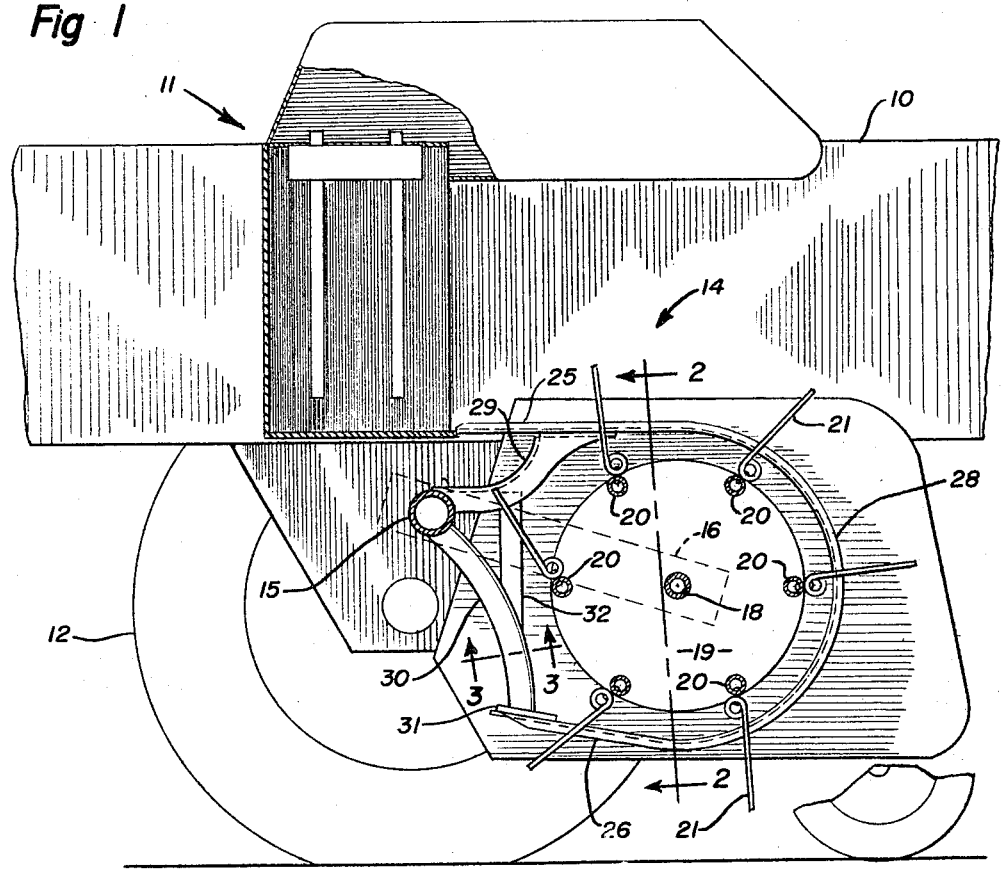
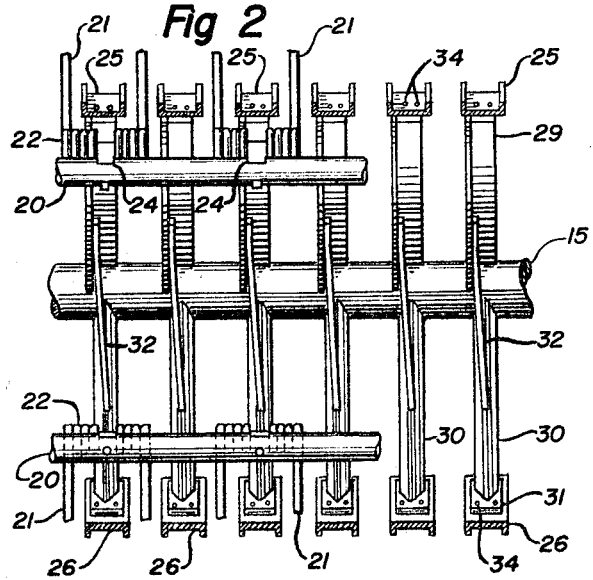
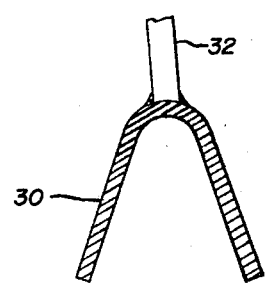

3,397,527
PICKUP GUARD MOUNTING MEANS
Otto W. Luek, New Holland, and Robert G. Young, Bird-in-Hand, Pa., assignors to Sperry Rand Corporation, New Holland, Pa., a corporation of Delaware
Filed May 26, 1966, Ser. No. 553,216
3 Claims. (Cl. 56—364)

This invention relates to crop pickup devices as used on various types of harvesting machines to pick up a windrow of mowed hay or the like from the ground and deliver it into the harvesting machine.

The basic components of pickup devices are a rotatable reel having radial pickup tines and a plurality of fixed members known as guards or strippers. The reel is rotated in a direction whereby the tines engage crop material lying on the ground and elevate it upwardly and rearwardly over the top of the reel into the harvesting machine. The tines travel between fixed guards or stripper plates which support the crop material as the tines move it. At the point where the pickup discharges the crop material, the tines withdraw from the material between the guards.

In the course of operation, the tines sometimes become laterally bent from engagement with foreign objects. These tines continue in their normal operating path, guided by the guards, until they reach the discharge point of their path of travel and withdraw between the guards. When they withdraw between the guards, they move laterally and do not line up with the space between the guards when they move on around the reel to the crop engaging position again. These tines are then caught behind the guard members instead of projecting between them and do not pick up the crop material. Sometimes special guards are provided to hold the tines in line during their return travel from the crop discharge point to the crop engaging point. This increases the cost of the pickup device as well as complicating the job of removing the guards. On pickup devices it is usually necessary to remove the guards to service and repair the reel. Guards also are sometimes damaged by foreign objects and must be replaced. Generally, delays in a harvesting operation have a direct effect on the quality of the harvested crop and should be eliminated or reduced to an absolute minimum whenever possible.

It is an object of this invention to provide a crop pickup device wherein the tines cannot be rendered inoperative by lateral bending.

It is an object of this invention to provide in a crop pickup device means confining the pickup tines to travel in paths between the guards without increasing the cost of the device.

It is another object of this invention to provide a crop pickup device wherein the tines are confined, at all points in their paths of travel, to movement in planes between the guards and wherein the guards are still simply and readily removable for repairs and service.

It is another object of this invention to provide a crop pickup device according to the above objects wherein any or all the guards are readily removable without deformation of the guards.

It is the general object of this invention to provide a rugged, simply constructed, low cost pickup device wherein the guards are readily removable and wherein the tines are laterally confined at all times.

These and other objects of this invention will be apparent upon reference to the following description in claims taken in conjunction with the accompanying drawings wherein:

FIG. 1 is a fragmentary side elevational view of a hay baler with portions broken away to show the interior construction of the crop pickup device;

FIG. 2 is a fragmentary sectional view taken on the line 2—2 of FIG. 1; and

FIG. 3 is a fragmentary sectional view taken on the line 3—3 of FIG. 1.

Referring now to the drawings in detail, as an example of a hay harvesting machine, FIG. 1 shows an automatic hay baler having the usual fore-and-aft extending bale forming chamber 10 and cross feed mechanism, generally indicated by the reference numeral 11. The baler is supported on ground wheels 12 for movement in a forward direction which would be from left to right as seen in FIG. 1. A pickup device, generally indicated by the reference numeral 14, engages crop material lying on the ground, elevates it and delivers it rearwardly into the open front end of the cross feed mechanism 11.

The pickup device 14 has a main transverse horizontal frame member in the form of a pipe 15 which is journalled on the hay baler frame. At each end of main frame member 15, a downwardly and forwardly extending frame arm 16 (one shown in phantom lines in FIG. 1) is provided. The pickup reel is journalled in, and extends between, the forward ends of the frame arms 16.

The pickup reel has a central shaft 18 extending parallel to main frame member 15 and constituting the axis of rotation of the reel. End spiders, or discs, 19 are fixed to shaft 18 adjacent the ends thereof. A plurality of tine bars 20 extend between the end discs 19 and have their ends journalled in the discs. A plurality of pickup tine units 21 are mounted on each of the tine bars 20 at regular spaced intervals along each tine bar.

As may be seen in FIG. 2, a tine unit normally comprises a pair of parallel spaced apart tines interconnected at one end by a coil spring portion 22. The center section of the coil spring portion 22 is attached to the tine bar 20 by the usual mounting brackets 24. As the reel rotates counterclockwise in FIG. 1 about its central shaft 18, the radially extending tines 21 travel about the shaft 18 in parallel spaced apart vertical planes. It is well known in the pickup art, and therefore not illustrated here, to provide cam and cam follower means which rock each tine bar 20 about its own axis as it orbits about the central axis of shaft 18. The purpose of this rocking motion of the tine bars is to cause the tines 21 to extend radially outwardly as they pass below the reel shaft 18 into engagement with crop material lying on the ground and to cause the tines to tilt rearwardly, relative to their direction of travel, after they pass above the main reel shaft 18 and withdraw downwardly from the crop material between the guard members. The radially outermost ends of the tines travel in circuitous parallel vertical paths about the central reel shaft 18 whether or not such a cam and cam follower mechanism is incorporated into the reel.

Referring to FIG. 1, the present invention utilizes guard members having generally parallel upper and lower leg portions 25 and 26, respectively, integrally connected by a substantially 180 degree arcuate bight portion 28. The guard members lie in vertical planes interposed between the vertical planes of travel of pickup tines 21. The arcuate bight portion 28 of each guard extends around the opposite side of the reel from that occupied by frame member 15 and is disposed radially outwardly from the circular path of travel of the tine bars 20, but radially inwardly from the circuitous path of travel of the radially outer ends of the tines 21. The upper and lower leg portions 25 and 26 of each guard member extend tangentially rearwardly from bight portion 28 above and below the reel, respectively, toward main pickup frame member 15.

A first, or upper, series of support members 29 are fixedly mounted on main pickup frame member 15. The upper support members 29, respectively, extend forwardly from frame member 15 toward the pickup reel and then curve upwardly to the upper leg portions 25 of each guard. The upper support members 29 are L-shaped in cross section thereby providing rigid support in both the vertical and horizontal planes at minimal cost. One upper support member 29 is provided for each guard and is attached to frame member 15 in the vertical plane of the guard.

A second, or lower, series of support members 30 are fixedly attached to main frame member 15 in the same vertical planes as upper support members 29. Lower support members 30 are V-shaped in cross section as may be seen in FIG. 3. These support members extend forwardly from frame member 15 toward the pickup reel and then downwardly to join the lower leg portions 26 of the guard members. The apex of the V-shaped lower support members 30 is disposed forwardly toward the pickup reel. A plate 31 (see FIG. 2) is welded on the lower end of each lower support 30 to facilitate attachment of the guards to the lower supports.

A series of vertical braces 32, one for each set of upper and lower supports 29 and 30, are welded between the upper and lower support members. As may be seen in FIGS. 2 and 3, the lower ends of the braces 32 are welded to lower support members 30 on the apex of the cross sectional V-shape of the members 30. The upper ends of the braces 32 are preferably welded to the side flange of the L-shaped upper support members 29.

It may be seen in FIG. 1 that the braces 32 extend generally vertically between the upper and lower support members and are disposed radially inwardly of the path of travel of the radially outermost ends of the pickup tines as they traverse the return portion of their path from the discharge point at the top of the pickup to the crop engaging point below the pickup. It may also be seen in FIG. 1 that the portion of the upper support members 29 extending between the braces 32 and the upper guard legs 25 also lie radially inwardly of the path of travel of the radially outer end of the tines. The same relationship exists relative to the portion of lower support members 30 extending between braces 32 and lower guard legs 26. By this construction, the tines 21 are positively confined to travel in their particular vertical planes at all points along their circuitous paths of travel. The cross sectional configuration of upper and lower support members 29 and 30, along with the A-frame configuration afforded by the interconnecting vertical braces 32 provides maximum strength along with simplicity and low cost. In FIG. 2 it may be seen that should a pickup tine 21 be deformed laterally, by contact with a stone or other foreign object, and attempt to move laterally under a guard member as it moves from the discharge point to the crop engaging point, it will first be confined by either the vertical or horizontal flange portion of the upper support member 29, then by the vertical brace 32, and then be "cammed" laterally outward again by the V-shaped configuration of lower support member 30 as it approaches the lower leg 26 of the pickup guard member.

The guards are supported from the main pickup frame solely by removable fasteners such as bolts or rivets 34 connecting the upper and lower leg portions 25 and 26 of the guards to the upper and lower supports 29 and 30. It will be apparent from FIG. 1 that upon removal of the fasteners 34, the pickup guards are readily removable forwardly over the reel without the necessity of springing or deforming the guard members.

Having thus described our invention, what we claim is:

1. A crop pickup comprising a frame having a generally horizontal main frame member, a reel having a plurality of tine bars and a central horizontal axis of rotation, means mounting said reel on said frame along one side of said main frame member with said axis of rotation parallel to said main frame member, said tine bars having radially extending tines thereon whose radially outer ends travel in circuitous paths in parallel vertical planes about said axis of rotation upon rotation of the reel, a plurality of generally U-shaped guards disposed in vertical planes interposed between said planes of travel of said tines, each of said guards having generally parallel upper and lower leg portions spaced apart a distance in excess of the diameter of said reel and integrally interconnected by an arcuate bight portion, said arcuate bight portion extending around the side of said reel diametrically opposite said main frame member and lying radially between said tine bars and said path of travel of said radially outer ends of said tines, said upper and lower leg portions, respectively, extending tangentially from said arcuate bight portion above and below said reel toward said main frame member, a first series of support members respectively disposed in the vertical planes of said guards, said first support members extending from said main frame member toward said reel and upwardly to said upper leg portions of said guards, a second series of support members respectively disposed in the vertical planes of said guards, said second support members extending from said main frame member toward said reel and downwardly to said lower leg portions of said guards, a series of braces respectively disposed in the vertical planes of said guards, each of said braces extending generally vertically between a first and second support member and radially inwardly of said path of travel of said radially outer ends of said tines relative to said axis of rotation of said reel, the portions of said first and second support members disposed between said braces and said guard legs also extending radially inwardly of said path of travel of said radially outer ends of said tines whereby each tine is confined, at all points along its circuitous path, to travel in its particular vertical plane, said second series of support members each being generally V-shaped in cross section with the apex of the V facing toward said reel, and said braces being connected to said second support members substantially on said apexes.

2. A crop pickup as recited in claim 1 including means for removably connecting said upper and lower leg portions of said guards respectively to said first and second series of support member whereby said guards may be selectively removed outward from said reel upon removal of said connecting means without deformation of said stripper members.

3. A crop pickup comprising a frame having a generally horizontal main frame member, a reel having a plurality of tine bars and a central horizontal axis of rotation, means mounting said reel on said frame along one side of said main frame member with said axis of rotation parallel to said main frame member, said tine bars having radially extending tines thereon whose radially outer ends travel in circuitous paths in parallel vertical planes about said axis of rotation upon rotation of the reel, a plurality of generally U-shaped guards disposed in vertical planes interposed between said planes of travel of said tines, each of said guards having generally parallel upper and lower leg portions spaced apart a distance in excess of the diameter of said reel and integrally interconnected by an arcuate bight portion, said arcuate bight portion extending around the side of said reel diametrically opposite said main frame member and lying radially between said tine bars and said path of travel of said radially outer ends of said tines, said upper and lower leg portions, respectively, extending tangentially from said arcuate bight portion above and below said reel toward said main frame member, a first series of support members respectively disposed in the vertical planes of said guards, said first support members extending from said main frame member toward said reel and upwardly to said upper leg portions of said guards, a second series of support members respectively disposed in the vertical planes of said guards, said second support members extending from said main frame member toward said reel and downwardly to said lower leg portions of said guards, portions of said first and second support members extending radially inwardly of said path of travel of said radially outer ends of said tines between said upper and lower leg portions of said guards to engage and guide tines as they travel from said upper leg portions to said lower leg portions of said guards, said second series of support members each being generally V-shaped in cross section with the apex of the V facing toward said reel and the sides of the V diverging away from said reel to guide said tines laterally between said lower leg portions of adjacent guards.

References Cited

UNITED STATES PATENTS

| | | | |
|---|---|---|---|
| 2,430,734 | 11/1947 | Raney et al. | 56—364 |
| 2,527,887 | 10/1950 | Martin | 56—364 |
| 3,226,921 | 1/1966 | Shepley | 56—364 |

FOREIGN PATENTS 895,797  5/1962  Great Britain.

ABRAHAM G. STONE, *Primary Examiner.*

P. A. RAZZANO, *Assistant Examiner.*